United States Patent [19]

Marrero

[11] Patent Number: 5,509,227

[45] Date of Patent: Apr. 23, 1996

[54] FISHING NET MECHANISM

[76] Inventor: Orestes Marrero, 75 W. 9th St., Hialeah, Fla. 33010

[21] Appl. No.: 408,369

[22] Filed: Mar. 22, 1995

[51] Int. Cl.$^6$ ................................................ A01K 71/00
[52] U.S. Cl. ................................................ 43/7; 43/100
[58] Field of Search .............................. 43/7, 8, 14, 100, 43/105, 102; 119/223, 240; 294/66.1, 68.21

[56] References Cited

U.S. PATENT DOCUMENTS

| | | | |
|---|---|---|---|
| 1,262,507 | 4/1918 | Johnston | 43/105 |
| 2,549,475 | 4/1951 | Jardim | 43/11 |
| 4,092,797 | 6/1978 | Azurin | 43/105 X |

FOREIGN PATENT DOCUMENTS

| | | | |
|---|---|---|---|
| 1069304 | 1/1980 | Canada | 43/7 |
| 154116 | 11/1920 | United Kingdom | 43/102 |

*Primary Examiner*—Jack W. Lavinder
*Assistant Examiner*—Jeanne M. Elpel
*Attorney, Agent, or Firm*—Jesus Sanchelima

[57] ABSTRACT

A fishing net mechanism with a supporting tubular frame and an inflatable floating assembly mounted thereon. A compressor in a vessel is connected to the inflatable floating assembly to submerge or bring afloat the fishing net mechanism. Two identical pairs of interlocking sections define the supporting tubular frame. Carrier assemblies slidably mounted to the supporting tubular frame hold the net member through an edge cable positioned at the rim. Upper and lower cables are used to control the position of the mechanism which is hoisted to the vessel. A constraining loop is controlled by the lower cable and when inside the vessel is allowed to release the netted fish.

6 Claims, 3 Drawing Sheets

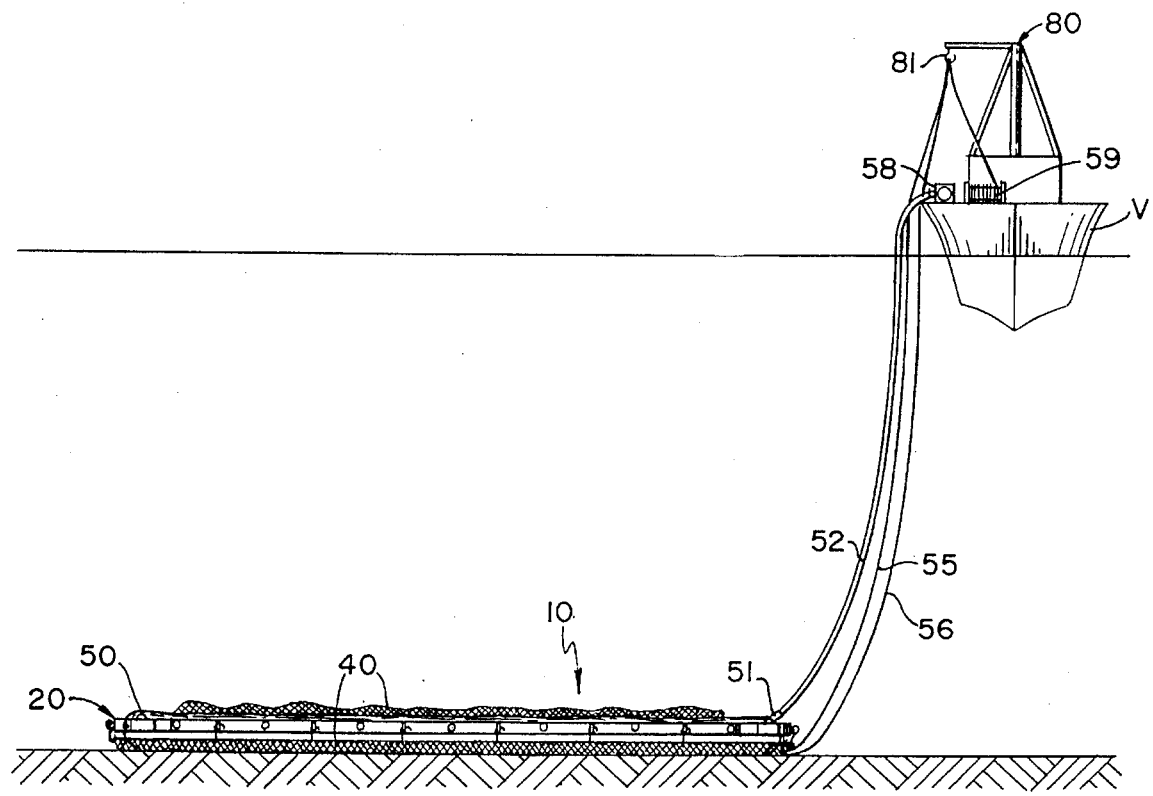
FIG - 1 -
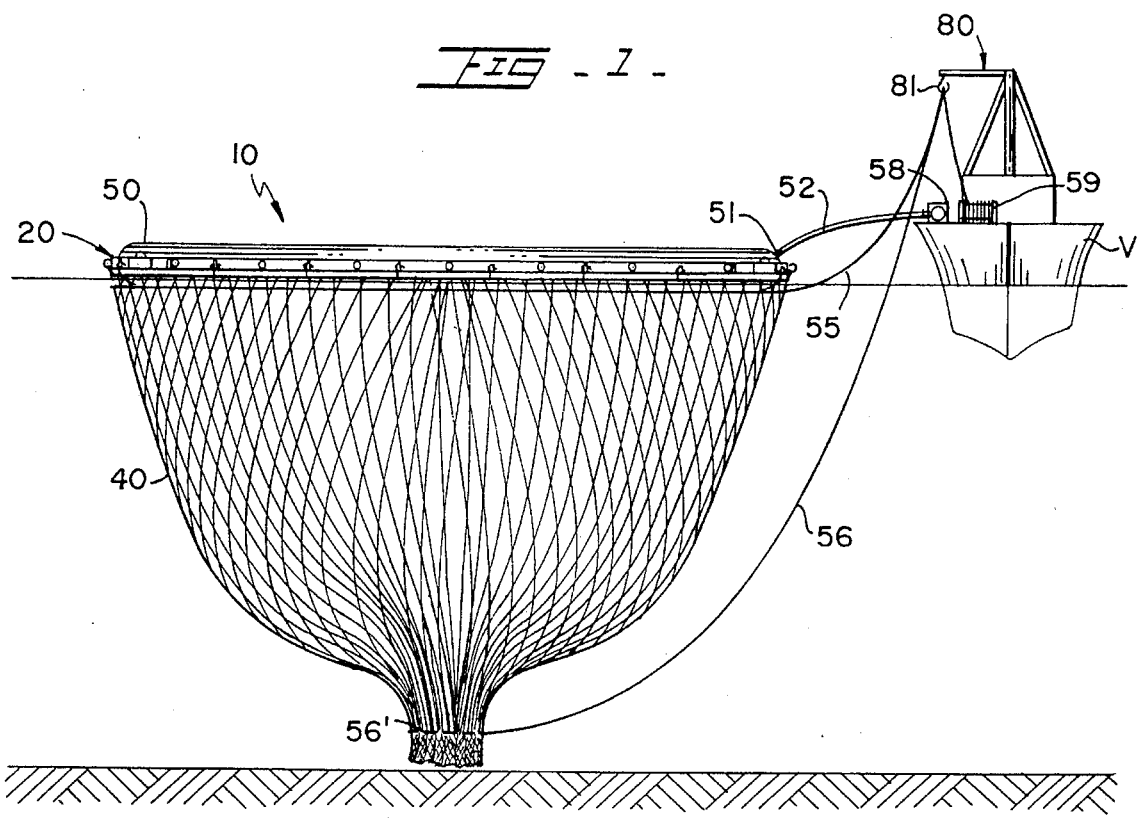
FIG - 2 -

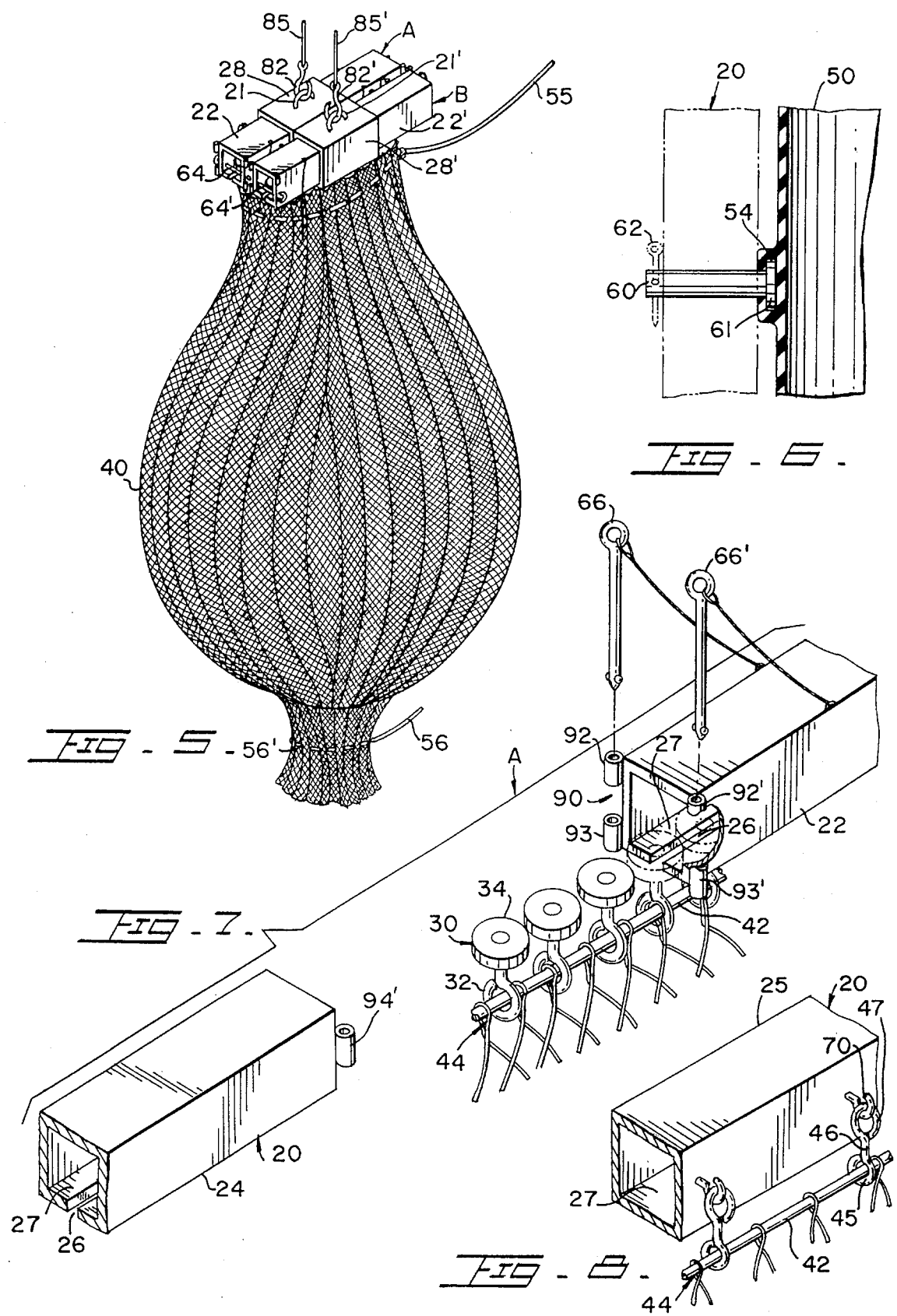

FISHING NET MECHANISM

BACKGROUND OF THE INVENTION

1. Field of the Invention

The present invention relates to fishing net mechanisms, and more particularly, to those that are of the collapsible type and include inflatable floating means.

2. Description of the Related Art

Many fishing net devices have been designed in the past. Most of them are cast in a body of water and kept partially afloat with floating assemblies with different characteristics.

Applicant believes that the closest reference corresponds to U.S. Pat. No. 2,549,475 issued to J. S. Jardim. However, it differs from the present invention because it does not disclose a collapsible device with the characteristics claimed in the present application that maximizes its volumetric and portability efficiency.

Other patents describing the closest subject matter provide for a number of more or less complicated features that fail to solve the problem in an efficient and economical way. None of these patents suggest the novel features of the present invention.

SUMMARY OF THE INVENTION

It is one of the primary objects of the present invention to provide a collapsible fishing net that is volumetrically efficient and that can be stored in a minimum of space aboard a vessel that transports it for deployment.

It is another object of the present invention to provide a fishing net that includes submergible floating means to selectively lift the supporting tubular assembly for the net and lower it as required.

It is still another object of this invention to provide a fishing net that can be readily assembled and disassembled in open seas.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an elevational view of the fishing net subject of the present application submerged in a body of water showing its floating member deflated.

FIG. 2 shows an elevational view of the fishing net represented in the previous figure with inflatable floating member inflated thereby lifting the net and its lower cable constraining the bottom of the net.

FIG. 5 shows the net member after being retrieved and after the hook carriers have been slid inside short sections and the mechanism is ready to be hoisted out of the water.

FIG. 6 is a partial cross-sectional view of the vulcanized pocket on the exterior surface of the inflatable floating member holding a headed pin and the supporting tubular assembly is shown in phantom.

FIG. 7 is an isometric view of portions of two short sections of the tubular assembly separated showing the interlocking mechanism and the holding net edge cable of the net member supported by hook members slidably mounted to the supporting tubular assembly.

FIG. 8 shows a partial isometric view of one of the large sections of the supporting tubular assembly and the holding net edge cable of the net removably supported by hook member mounted to the tubular assembly.

DETAILED DESCRIPTION OF THE PREFERRED EMBODIMENT

Figure 3:
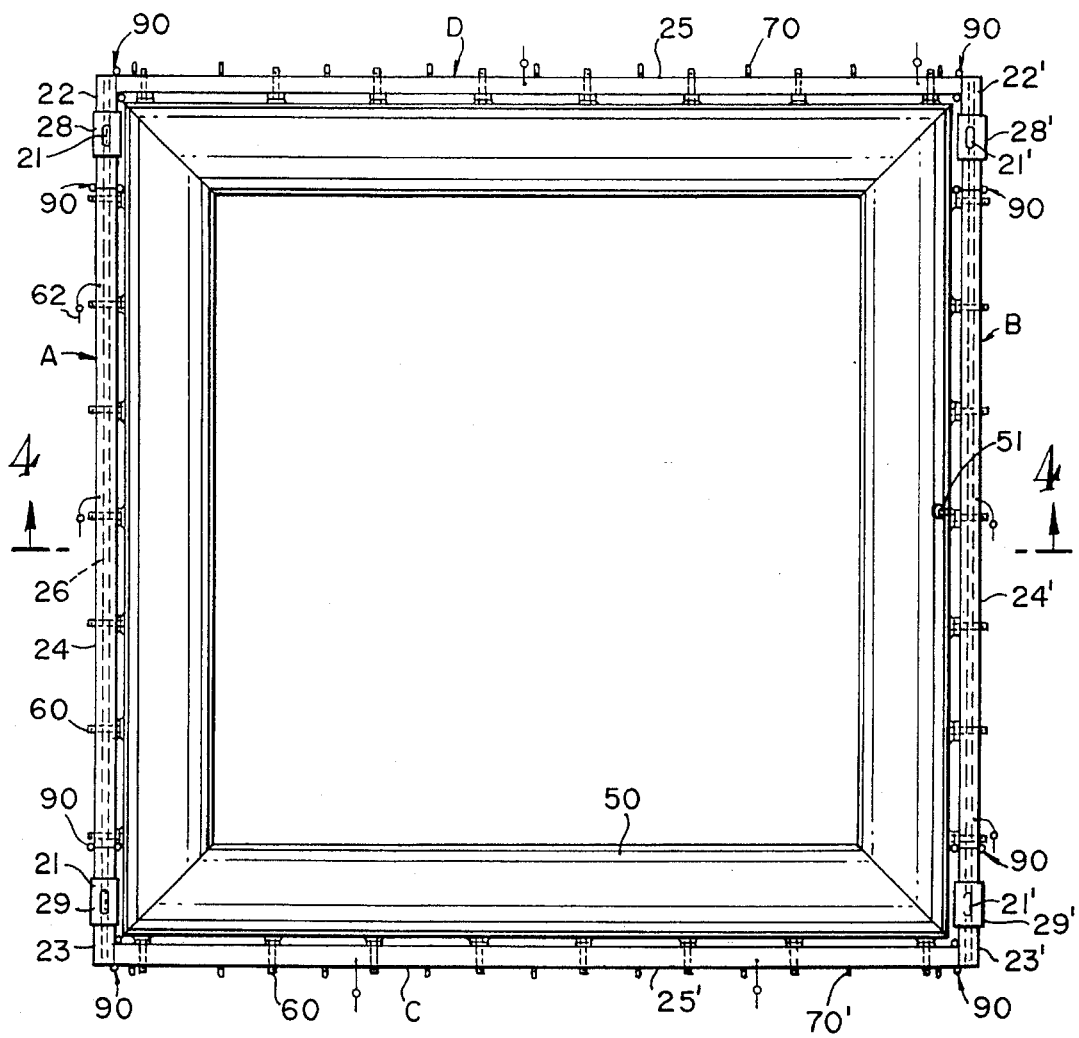
FIG. 3 illustrates a top view of the fishing net's supporting tubular assembly mounted to the inflatable floating member.
Figure 4:
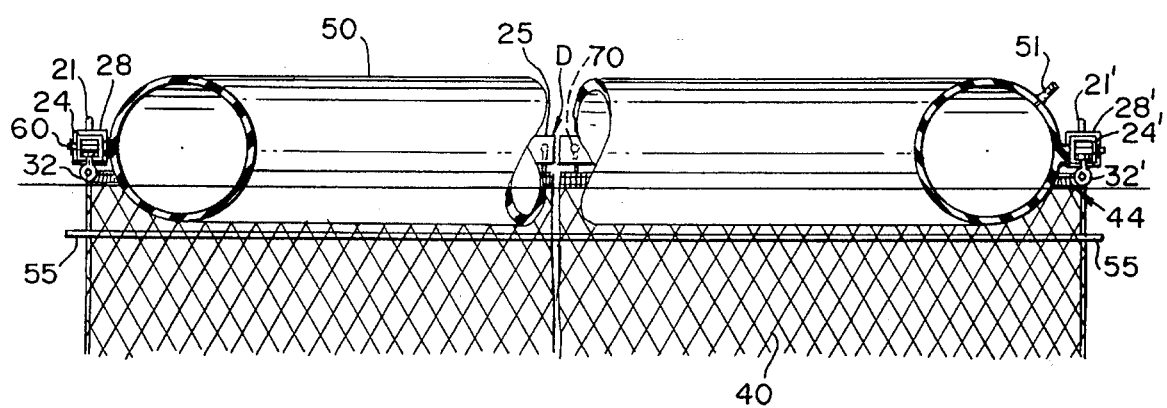
FIG. 4 is a broken cross-sectional representation of the inflatable floating member, taken along line 4—4 in FIG. 3.

Referring now to the drawings, where the present invention is generally referred to with numeral 10, it can be observed that it basically includes supporting tubular assembly 20, hook carrier assemblies 30 that are slidably mounted to tubular assembly 20, fishing net member 40 which is supported by holding net edge cable 42 to which assemblies 30 are slidably mounted, and inflatable floating member 50 mounted to tubular assembly 20.

As it can be seen from FIG. 1, fishing net mechanism 10 is shown submerged in a body of water since the overall density of the entire structure is greater than the density of the water body where it is submerged. Mechanism 10 rests on the bottom when inflatable floating assembly 50 is deflated. In FIG. 2, inflatable floating assembly 50 has been inflated raising net member 40 and netting the fish in that body of water. As member 40 is raised, cable member 56 is pulled constraining the bottom of member 40. As shown in FIGS. 1 and 2, air conduit 52 connects compressor 58 with inflatable floating assembly 50 through air valve 51 in order to provide pressurized air to selectively emerge or submerge fishing mechanism 10. Upper and lower cable members 55 and 56 are provided to control the position of fishing net mechanism 10 with respect to vessel V. Lower cable member 56, in the preferred embodiment, includes loop 56' that allows a user to constrain the bottom of net 40, as shown in FIGS. 2 and 5.

In FIG. 3 supporting tubular assembly 20 is shown removably mounted to inflatable floating member 50 by pins 60 and cotter pins 62. Inflatable floating member 50, in the preferred embodiment, has a rectangular configuration. Member 50 has, at selective points, vulcanized pockets 54, as best seen in FIG. 6. Pocket 54 snugly embraces headed end 61 of pin 60. Tubular assembly 20 is mounted to member 50 with pin members 60 and locked in place with cotter pin members 62.

Supporting tubular assembly 20, in the preferred embodiment, comprises short sections 22; 22'; 23; 23'; 24; 24' and large sections 25 and 25' with interlocking mechanisms 90 at their ends, as seen in FIG. 3. The assembled eight sections have a rectangular configuration. As seen in FIG. 7, sections 22; 22'; 23; 23'; 24 and 24' have a rectangular cross section and include longitudinal slot 26 on lower wall 27 of tubular assembly 20. Sections 22; 22'; 23; 23'; 24 and 24', when assembled, cooperatively align their longitudinal slots. Hook carrier assemblies 30 are partially housed within sections 22; 22'; 23; 23'; 24 and 24' with heads 34 slidably resting on the interior surface of lower wall 27. Sections 25 and 25' have a rectangular cross section and have no slot in their structure, as shown in FIG. 8.

Tubular assembly 20 is assembled by joining sections 22; 22'; 23; 23'; 24; 24'; 25 and 25' of tubular assembly 20 with interlocking mechanisms 90, as best seen in FIG. 3. Mechanisms 90, in the preferred embodiment, include tubular guide members 92; 92'; 93 and 93' rigidly mounted at the ends of sections 22; 22'; 23; 23'; 24; 24'; 25 and 25', and tubular guide member 94 (not shown) and 94' at the other end of adjacent, e.g., section 24 of tubular assembly 20, as best seen in FIG. 7. Tubular guide members 92; 93 and 94 (and members 92'; 93' and 94') align permitting pin member 66 (and member 66') to pass through, as best seen in FIG. 7. In this manner, tubular sections 22; 22'; 23; 23'; 24; 24'; 25 and 25' are connected together, forming tubular assembly 20.

Fishing net 40 is, at its upper end, supported by hook carrier assembly 30, as best seen in FIG. 7. Carrier assembly 30, in the preferred embodiment, comprises loop member 32 and head 34. Upper net rim 44 of fishing net 40 is supported by holding net edge cable 42 which in turn is supported by carrier assemblies 30. Head 34 of carrier assembly 30 travels through slot 26 of tubular assembly 20. This only occurs in sides A and B of tubular assembly 20. In sides C and D of tubular assembly 20, hooks 70 are rigidly mounted to sections 25 and 25' of tubular assembly 20. Eyelet members 46 include loops 45 and 47. Cable 42 passes through loop 45 and loop 47 receives hook 70. Eyelet members 46 removably hang net 40 on hooks 70, that are located in sides C and D of tubular assembly 20.

When a user decides to retrieve fishing net member 40 from the water, loops 47 are dismounted from hook members 70. Subsequently, sections 25 and 25' are detached from sections 22; 22'; 23 and 23'. Then, carrier assemblies 30 are slid through slot 26 of lower wall 27 of assembly 20. In this manner, fishing net 40 is pulled together and carrier assemblies 30 are supported only by two short sections 22 and 22' or sections 23 and 23' of side A and B. In FIG. 5 we have selected sections 22 and 22'. Security pins 64 and 64' are designed to prevent carrier assemblies 30 from leaving sections 22 or 22', as it is illustrated in FIG. 5. Once net 40 is closed with fish inside, mechanism 10 is hoisted by passing hooks 82 and 82' through eyelet members 21 and 21', which are rigidly mounted to reinforcement members 28 and 28', respectively. Tubular sections 22; 22'; 23 and 23', in the preferred embodiment, have reinforcement members 28; 28; 29 and 29' that reinforce the area where hoist pulling force is exerted. Upper cable 55 tightens the upper portion of fishing net 40. Mechanism 10 is hoisted by hooks 82 and 82' that are mounted to eyelet members 21 and 21'. Hooks 82 and 82' are mounted to one end of pulling cables 85 and 85'. Cables 85 and 85' are wound, at their other ends, to spool assembly 59 placed in vessel V via hook 81 and support boom 80, to hoist net mechanism 10 and bring it inside vessel V.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A fishing net mechanism, comprising:
    A. supporting tubular means including a plurality of cooperative interlocking sections that form a frame having first and second pairs of symmetrical opposing sides;
    B. a plurality of hook carrier assemblies mounted to said supporting tubular means;
    C. fishing net means having an upper edge mounted to said hook carrier assemblies;
    D. inflatable floating means mounted to said supporting tubular means and said inflatable floating means having sufficient capacity to cause said supporting tubular means to float when fully inflated;
    E. a source of compressed air connected to said inflatable floating means; and
    F. cable means for hoisting said mechanism and said cable means being connected to said supporting tubular means.

2. The mechanism set forth in claim 1 wherein the interlocking sections forming said first pair of symmetrical opposing sides are hollow and include a longitudinal slot, and said hook carrier assemblies are slidably mounted to said supporting tubular means through said longitudinal slot.

3. The mechanism set forth in claim 2 wherein the interlocking sections of said first pair have a rectangular cross-section with a lower wall having an inner surface and said hook carrier assemblies include a head that slidably rests on said inner surface.

4. The mechanism set forth in claim 3 wherein the interlocking sections of the second pair include a plurality of hook means for removably supporting a portion of said fishing net means.

5. The mechanism set forth in claim 4 wherein said fishing net means includes an edge cable mounted to said upper edge to which said carrier assemblies are mounted.

6. The mechanism set forth in claim 5 wherein said fishing net means includes eyelet means slidably mottoted to said edge cable and said eyelet means cooperatively receive said hook means.

* * * * *